Feb. 18, 1958     I. SCHNEIDER     2,823,461
TILTING ARBOR SAW GAGE
Filed Nov. 22, 1954

Irving Schneider
INVENTOR.

2,823,461
TILTING ARBOR SAW GAGE

Irving Schneider, Fair Lawn, N. J.

Application November 22, 1954, Serial No. 470,256

1 Claim. (Cl. 33—185)

This invention relates generally to indicating or gage devices and pertains more particularly to a gage adapted to determine the angle of inclination and depth of cut of a tilting arbor saw.

A primary object of this invention is to provide a quick and easy means for setting the angle of inclination of a tilting arbor saw to a predetermined degree.

Another object of this invention is to provide a rapid means of determining the depth of cut of a tilting arbor saw.

Still another object of this invention is to provide an improved gage mechanism to determine simultaneously the angle of cut and depth of a cut of a tilting arbor saw.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
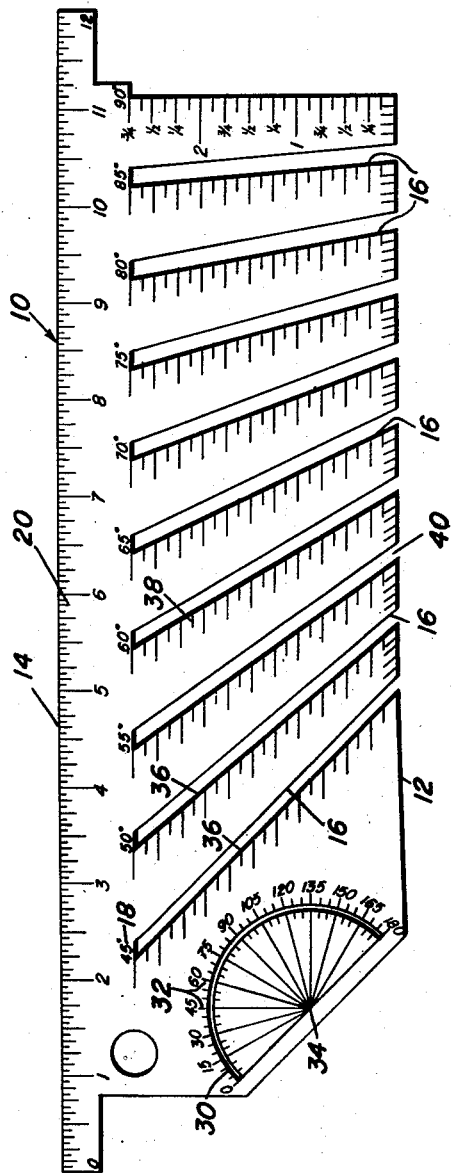
Figure 1 is a plan view of the gage.
Figure 2:
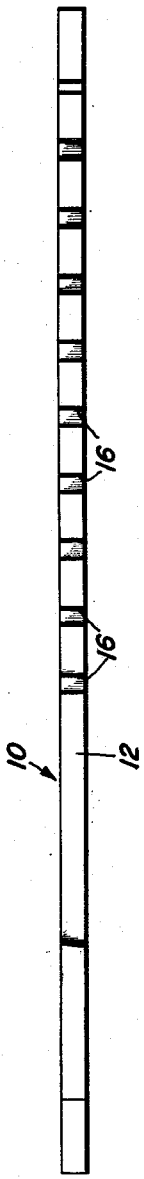
Figure 2 is an end view of the gage.

Referring now more particularly to the drawings, the gage will be seen to consist primarily of a flat plate indicated generally by the reference character 10 which has a lower straight edge portion 12 and an upper straight edge portion 14.

Intersecting the lower straight edge 12 is a series of slots or notches 16 disposed at various angular dispositions with respect to the edge 12 and provided with suitable indicia 18 identifying the particular angle of inclination of each slot.

The upper edge 14 of the gage is provided with indicia 20 therealong such that the same may be utilized as a straight edge or scale.

One corner of the gage assembly is provided with an arcuate slot 30 and angular indicia 32 therealong and with an aperture 34 such that the device defines at this point a protractor for laying out angles as desired.

Additionally, the edges 36 of the gage or plate 10 which define one side of each of the notches 16 are provided therealong with indicia 38, the purpose of which will be presently apparent.

In practical use of the above described invention, the straight edge 12 is engaged upon the saw table with the plate 10 in a vertical position with one of the notches straddling the saw. Assuming that the saw is required to be adjusted to an angle of 55 degrees, the saw blade is tilted by a conventional mechanism until such point that the slot particularly indicated by the reference character 40 will straddle on opposite sides of the saw blade while the straight edge 12 is in intimate contact with the surface of the saw table along its entire length. The operator then, of course, is apprised of the fact that the inclination of the tilting arbor saw is exactly 55 degrees, as desired. The operator may then adjust the depth of the blade in a conventional manner and may be apprised of the length of cut by the indicia 38 previously described.

Further, the gage when in place for indicating both the angle and depth of cut may be utilized to properly locate the fence associated with the saw table and for this purpose it will be readily apparent that the straight edge portion 14 functions for this purpose. In other words, the gage is simultaneously utilized to apprise the operator of the correct angular disposition of the saw blade and simultaneously of its depth of penetration and the distance between the saw blade and the fence against which the work is held.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A device for simultaneously determining the angle of inclination of a saw blade and the depth of cut thereof, said device comprising a one-piece flat plate having parallel side edges, a plurality of equal depth slots extending inwardly from one side edge of the plate for receiving a saw blade therein, all of said slots being disposed in different angular relation to the one side edge of the plate, each of said slots having indicia at the inner end thereof for designating the angular relation between the slot and said one edge, and graduated indicia on one edge of the slot for indicating the depth of cut of the saw blade.

References Cited in the file of this patent

UNITED STATES PATENTS

| 390,664 | Gould | Oct. 9, 1888 |
| 1,504,975 | Ring | Aug. 12, 1924 |
| 1,860,174 | Cronk | May 24, 1932 |
| 2,204,927 | Cramer | June 18, 1940 |
| 2,638,134 | Kearney | May 12, 1953 |
| 2,694,262 | Daniel | Nov. 16, 1954 |

FOREIGN PATENTS

| 937 | Great Britain | 1901 |
| 18,775 | Sweden | July 9, 1904 |